United States Patent
Goel et al.

(10) Patent No.: US 11,726,776 B2
(45) Date of Patent: Aug. 15, 2023

(54) SUPER-APP EXTENSION DISCOVERY AND CONFIGURATION VIA SOURCE CODE MANAGEMENT PLATFORM COMMENTS

(71) Applicant: Microsoft Technology Licensing, LLC, Redmond, WA (US)

(72) Inventors: Hardik Goel, Seattle, WA (US); Arno Mihm, Sammamish, WA (US); Dragos Daniel Boia, Seattle, WA (US); Jacek Andrzej Czerwonka, Sammamish, WA (US); Maksim Shmelev, Snoqualmie, WA (US)

(73) Assignee: Microsoft Technology Licensing, LLC

(*) Notice: Subject to any disclaimer, the term of this patent is extended or adjusted under 35 U.S.C. 154(b) by 4 days.

(21) Appl. No.: 17/579,423

(22) Filed: Jan. 19, 2022

(65) Prior Publication Data
US 2023/0229434 A1 Jul. 20, 2023

(51) Int. Cl.
*G06F 8/71* (2018.01)
*G06F 8/36* (2018.01)
*G06F 8/73* (2018.01)

(52) U.S. Cl.
CPC ............ *G06F 8/71* (2013.01); *G06F 8/36* (2013.01); *G06F 8/73* (2013.01)

(58) Field of Classification Search
None
See application file for complete search history.

(56) References Cited

U.S. PATENT DOCUMENTS

| | | | |
|---|---|---|---|
| 9,201,646 B2 | 12/2015 | Balachandran | |
| 9,898,280 B2* | 2/2018 | Balachandran | G06F 8/43 |
| 9,916,224 B2* | 3/2018 | Macleod | G06F 11/3688 |
| 10,180,836 B1* | 1/2019 | Arguelles | G06F 8/75 |
| 10,606,739 B2* | 3/2020 | Kakkad | G06F 8/77 |
| 10,769,054 B1 | 9/2020 | Henkle et al. | |
| 10,877,869 B1* | 12/2020 | Nair | G06Q 10/06 |
| 2016/0283346 A1 | 9/2016 | Kriegsman et al. | |

(Continued)

OTHER PUBLICATIONS

Gherfal, "Code Reviews Using the Visual Studio Pull Requests Extension", 2019, Microsoft developers blog (Year: 2019).*

(Continued)

*Primary Examiner* — Hossain M Morshed
(74) *Attorney, Agent, or Firm* — Workman Nydegger

(57) ABSTRACT

Integrating super-app extension discovery and configuration within source code management platform comments. Based on a triggering event associated with a context within a code repository, a super-app identifies a set of extensions available for execution against the context, and triggers execution of at least a subset of the set of extensions against the context. The super-app generates a super-app output that includes an output of having triggered the subset of extensions against the context, a listing of one or more of the set of extensions as being a library of available extensions to the super-app, and an indication of a comment-based syntax for configuring an extension to the super-app. The super-app posts that output as a comment on a comment feed. Based on user input received via a comment using the comment-based syntax, the super-app generates a modified super-app configuration associated with the code repository.

20 Claims, 6 Drawing Sheets

(56) References Cited

U.S. PATENT DOCUMENTS

2020/0019493 A1* 1/2020 Ramakrishna ...... G06F 11/3688
2020/0081963 A1* 3/2020 Dickson ................... G06F 8/71

OTHER PUBLICATIONS

"Codacy", Retrieved from: https://web.archive.org/web/20170522163252/https:/github.com/marketplace/codacy, May 22, 2017, 3 Pages.

"DeepScan", Retrieved from: https://web.archive.org/web/20190506202137/https:/github.com/marketplace/deepscan, May 6, 2019, 3 Pages.

"Pull Request Quantifier", Retrieved from: https://web.archive.org/web/20210623104344/https:/github.com/marketplace/pull-request-quantifier, Jun. 23, 2021, 3 Pages.

"The Rise of Super App", Retrieved from: https://web.archive.org/web/20200203174640/https:/agiletech.vn/super-app/, Feb. 3, 2020, 9 Pages.

Gherfal, Taysser, "Code Reviews Using the Visual Studio Pull Requests Extension", Retrieved from: https://devblogs.microsoft.com/visualstudio/code-reviews-using-the-visual-studio-pull-requestsextension/, May 20, 2019, 8 Pages.

Laitila, Ville, "Your Github Pull Requests Analyzed for Effective Code Review", Retrieved from: https://softagram.com/github-app/, Apr. 1, 2019, 15 Pages.

Sjösten, Tobias, "Bitbucket Code Review", Retrieved from: https://bitbucket.org/product/features/code-review, Jun. 6, 2020, 9 Pages.

* cited by examiner

SUPER-APP EXTENSION DISCOVERY AND CONFIGURATION VIA SOURCE CODE MANAGEMENT PLATFORM COMMENTS

BACKGROUND

When developing a software application, developers frequently work on the application's code using a code repository within a source code management platform, such as Azure DevOps, GitHub, GitLab, etc. When using these source code management platforms, developers create a new branch from any existing branch (most often main or master branch) of the code repository. This new branch is a copy, or snapshot, of one or more files of the original/upstream branch. The developer then contributes to this new branch (e.g., by adding, removing, and/or editing files), and eventually requests to have those contributions merged into the original/upstream branch via a code review request (e.g., in GitHub, via a pull request). Such code review requests typically comprise a set of differences, or diffs, between the content of files in both branches as a set of proposed changes to be merged into the main branch.

As part of the code review experience, some source code management platforms also streamline the code review experience through support of extension applications that analyze the code involved in code review request, and that post analysis results in a comment feed for the code review request. Some of the examples of these extension applications are PullRequestQuantifier, DeepScan, and Codacy.

BRIEF SUMMARY

The inventors have observed the rise of "super applications" (super-apps) in the consumer, hosted application, and web application space (Wechat, Bing results page, etc.). A super-app provides an all-in-one experience in a single application, by loosely integrating multiple extension applications. A super-app typically controls the interaction any such extension applications can have within the super-app context (for example, the super-app may provide the input for the extension application and process the output of the extension application, to present the extension application's output to the user in a consistent manner). In contrast, the model of extension applications in today's software engineering context (e.g., GitHub and others), typically provides a trigger and an input to the configured extension application, and the extension application then processes the input and interacts with the user or other systems directly. As extension applications in the latter case are not integrated into the environment (e.g., GitHub and others), they must bring their own configuration settings and procedures. This creates a very frustrating and inconsistent experience for the user configuring these extension applications. For instance, GitHub has its own library of available extension applications. GitHub enables users to navigate through a user interface, and to select extension applications to activate on their code repositories. Then a user typically needs to go to each of the extension applications and configure them individually, often following different procedures, and using different nomenclatures. When applied to code repositories, this means that, when selecting and configuring an extension application, a user loses a user interface context (e.g., the context of the current code review request) within the code repository; also, the user must familiarize themselves with this custom user interface each extension application may bring with it. Further, each extension application stores its configuration separately, and using a variety of configuration formats.

At least some embodiments described herein improve the discovery and configuration of extension applications within the software engineering context, by integrating super-app extension discovery and extension configuration using source code management platform comments, such as code review request comments. In embodiments, when a super-app posts a comment within a source code management platform context (e.g., a comment feed associated with a code review request), the super-app includes in that comment a library of extensions to the super-app that are available for users as part of the super-app. Thus, the embodiments herein enable users to discover available super-app extensions without losing their current context within the source code management platform.

Additionally, in embodiments, the super-app also includes in that comment an indication of a comment-based syntax for configuring super-app extensions (including, for example, activating and deactivating those extensions for a given code repository). Using this comment-based syntax, users are enabled to interact with the super-app—including activating and deactivating extensions discovered via the library—through posting of a comment in their current context (e.g., a code review request comment). Thus, the embodiments herein also enable users configure super-app extensions without losing their current context within the source code management platform.

In embodiments, when a user interacts with a super-app using a comment-based syntax, the super-app creates new code review request for checking in one or more configuration files to the code repository. This code review request includes any requested configuration changes to the super-app (including to its extensions). In embodiments, this new code review request follows the same approval workflow as other code review requests in the code repository. This streamlines the configuration experience for the super-app, including all of its extensions, and presents a consistent super-app configuration experience to all super-app users, while letting a code repository owner have the final say on super-app configuration changes (i.e., through a normal code review request approval workflow).

In some aspects, the techniques described herein relate to a method, implemented at a computer system that includes a processor, for integrating super-app extension discovery and configuration within source code management platform comments, the method including: based on a triggering event associated with a context within a code repository that is managed by a source code management platform, performing at least: identifying a set of extensions to a super-app, the set of extensions being available for execution against the context; based on a super-app configuration associated with the code repository, triggering execution of at least a subset of the set of extensions against the context; generating a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app; and initiating posting of the super-app output as a first comment on a comment feed associated with the context; after initiating posting of the super-app output as the first comment on the comment feed, receiving a user input via a second comment on the comment feed, the user input using the comment-based syntax to specify a configuration change for a particular extension in the set of extensions; and based at least on the user input, generating a modified super-app configuration associated with the code repository, the modified super-app configuration including the configuration change for the particular extension in the set of extensions.

In some aspects, the techniques described herein relate to a computer system for integrating super-app extension discovery and configuration within source code management platform comments, including: a processor; and a computer storage media that stores computer-executable instructions that are executable by the processor to cause the computer system to at least: based on a triggering event associated with a context within a code repository that is managed by a source code management platform, perform at least: identify a set of extensions to a super-app, the set of extensions being available for execution against the context; based on a super-app configuration associated with the code repository, trigger execution of at least a subset of the set of extensions against the context; generate a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app; and initiate posting of the super-app output as a first comment on a comment feed associated with the context; after initiating posting of the super-app output as the first comment on the comment feed, receive a user input via a second comment on the comment feed, the user input using the comment-based syntax to specify a configuration change for a particular extension in the set of extensions; and based at least on the user input, generate a modified super-app configuration associated with the code repository, the modified super-app configuration including the configuration change for the particular extension in the set of extensions.

In some aspects, the techniques described herein relate to a computer program product including a computer storage media that stores computer-executable instructions that are executable by a processor to cause a computer system to integrate super-app extension discovery and configuration within source code management platform comments, the computer-executable instructions including instructions that are executable by the processor to cause the computer system to at least: based on a triggering event associated with a context within a code repository that is managed by a source code management platform, perform at least: identify a set of extensions to a super-app, the set of extensions being available for execution against the context; based on a super-app configuration associated with the code repository, trigger execution of at least a subset of the set of extensions against the context; generate a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app; and initiate posting of the super-app output as a first comment on a comment feed associated with the context; after initiating posting of the super-app output as the first comment on the comment feed, receive a user input via a second comment on the comment feed, the user input using the comment-based syntax to specify a configuration change for a particular extension in the set of extensions; and based at least on the user input, generate a modified super-app configuration associated with the code repository, the modified super-app configuration including the configuration change for the particular extension in the set of extensions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
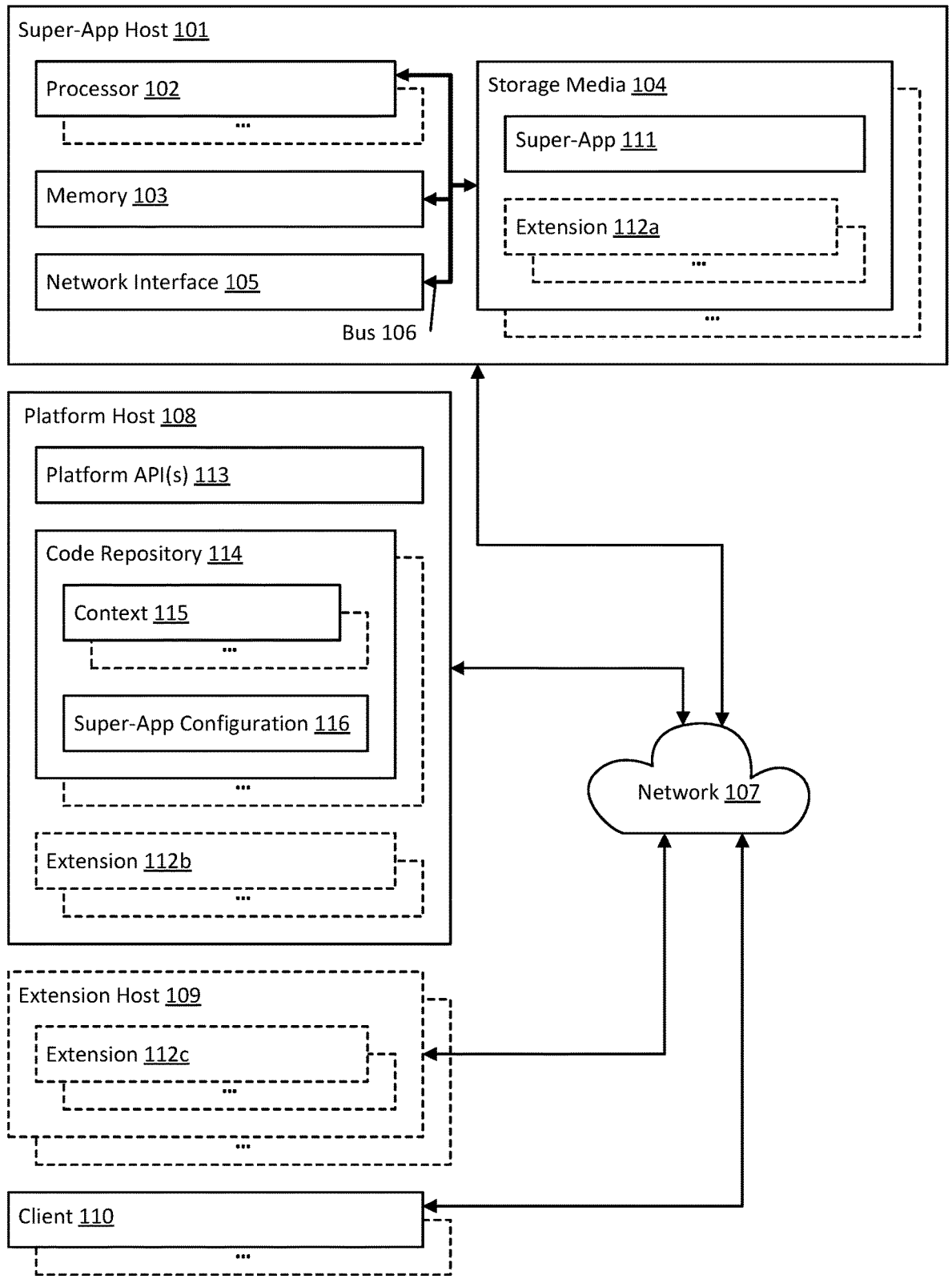
FIG. 1 illustrates an example computer architecture that facilitates super-app extension discovery and extension configuration via source code management platform comments.

At least some embodiments described herein integrate super-app extension discovery and extension configuration using source code management platform comments, such as code review request comments. In embodiments, when a super-app posts a comment within a source code management platform context (e.g., a comment feed associated with a code review request), the super-app includes in that comment a library of extensions to the super-app that are available for users as part of the super-app. Thus, the embodiments herein enable users to discover available super-app extensions without losing their current context within the source code management platform.

Additionally, in embodiments, the super-app also includes in that comment an indication of a comment-based syntax for configuring super-app extensions (including, for example, activating and deactivating those extensions for a given code repository). Using this comment-based syntax, users are enabled to interact with the super-app—including activating and deactivating extensions discovered via the library—through posting of a comment in their current context (e.g., a code review request comment). Thus, the embodiments herein also enable users configure super-app extensions without losing their current context within the source code management platform.

In embodiments, when a user interacts with the super-app using a comment-based syntax, the super-app creates new code review request for checking in one or more configuration files to the code repository, which include any requested configuration changes to the super-app (including to its extensions). In embodiments, this new code review request follows the same approval workflow as other code review requests in the code repository. This streamlines the configuration experience for the super-app, including all of its extensions, and presents a consistent super-app configuration experience to all super-app users, while letting a code repository owner have the final say on super-app configuration changes (i.e., through a normal code review request approval workflow).

As a result of these technical improvements, developer productivity is improved, by reducing the amount of time a developer spends searching for applications that would be applicable to the development process, and by reducing the amount of time a developer spends learning how to configure those applications.

As used herein, a "super-app" is an application that integrates the functionality of multiple extension applications, and that provides an all-in-one experience that aggregates functionality of the extension applications into a single application. In some embodiments a super-app is a container application that contains the extension application (e.g., as sub-applications); thus, in embodiments, one or more extension applications are integrated into the super-app itself. Additionally, or alternatively, in some embodiments a super-app is an orchestrating application that calls external extension applications; thus, in embodiments, one or more extension applications are separate from the super-app. Regardless of the overall relationship between a super-app and its extensions, a super-app provides inputs to extension applications, receives outputs from the extension applications based on those inputs, and provides a unified super-app output that includes at least a portion of these received outputs.

FIG. 1 illustrates an example computing environment 100 that facilitates super-app extension discovery and extension configuration via source code management platform comments. As shown, computing environment 100 includes a computer system (i.e., super-app host 101) comprising a processor 102 (or a plurality of processors), a memory 103, and one or more computer storage media (storage media 104), all interconnected by a bus 106.

The super-app host 101 also includes a network interface 105 for interconnecting, via a network 107, to one or more other computer systems—such as a platform host 108, an extension host 109 (or a plurality of extension hosts), and a client 110. While the super-app host 101, the platform host 108, and the extension host 109 (or hosts) are illustrated as being separate computer systems, in some embodiments one or more of these hosts are combined into a single computer system. For example, in some embodiments, the super-app host 101 and the platform host 108 are the same computer system (e.g., such that the platform host 108, itself, provides super-app functionality).

The storage media 104 is illustrated as storing computer-executable instructions implementing at least a super-app 111 that is configured to interoperate (e.g., using platform API(s) 113) with a source code management platform (e.g., Azure DevOps, GitHub, GitLab, and the like) provided by the platform host 108. Being a super-app, the super-app 111 is configured to provide an all-in-one experience that combines the functionality of a plurality of extensions into one application. For example, the super-app 111 may utilize any combination of extensions (referred to collectively as extensions 112) provided by one or more of (i) the super-app host 101 as part of the super-app 111 itself or as a separate entity (e.g., extension 112a), (ii) the platform host 108 (e.g., extension 112b), and/or (iii) one or more extension hosts (e.g., extension 112c at extension host 109). In some embodiments, one or more of the extensions 112 can operate as independent applications (i.e., separate from the super-app 111), while some embodiments one or more of extensions 112 are dependent on the super-app 111 to function.

As shown, the platform host 108 stores a code repository 114 (or a plurality of different code repositories) that each includes a context 115 (or a plurality of contexts). In embodiments each context 115 is a context within which the super-app 111, including the extensions 112 of the super-app 111, can operate to add enhanced functionality to the source code management platform provided by the platform host 108, for consumption by user(s) at the client 110 (or clients). In embodiments, each code repository 114 with which the super-app 111 is configured to operate stores a super-app configuration 116. For example, the super-app configuration 116 for a given code repository 114 can comprise any available configuration file format, such as flat text file(s), XML (Extensible Markup Language) file(s), YAML (YAML Ain't Markup Language) file(s), JSON (JavaScript Object Notation) file(s), binary formats, and the like. In embodiments, each context 115 is associated with at least one portion of code that the super-app 111 uses an input, and with a comment feed onto which the super-app 111 can post its output. In one embodiment, the context 115 is a code review request, such as a GitHub pull request. In this embodiment, the super-app 111 uses a code branch associated with the GitHub pull request (or one or more portions thereof) as input and posts its output to a comment feed associated with that pull request.

In accordance with the embodiments herein, the super-app 111 operates to integrate super-app extension discovery within the context of a comment feed for the context 115 (e.g., a code review request) on which the super-app 111 operates. For example, when the super-app 111 posts a comment to a comment feed associated with context 115, the super-app 111 includes, within that comment itself, a library of the extensions 112 that are available as part of the super-app 111. Thus, the embodiments herein enable user(s) at the client 110 (or clients) to discover available extensions to super-app 111, without leaving the context 115 (e.g., in a web browser).

Figure 3A:
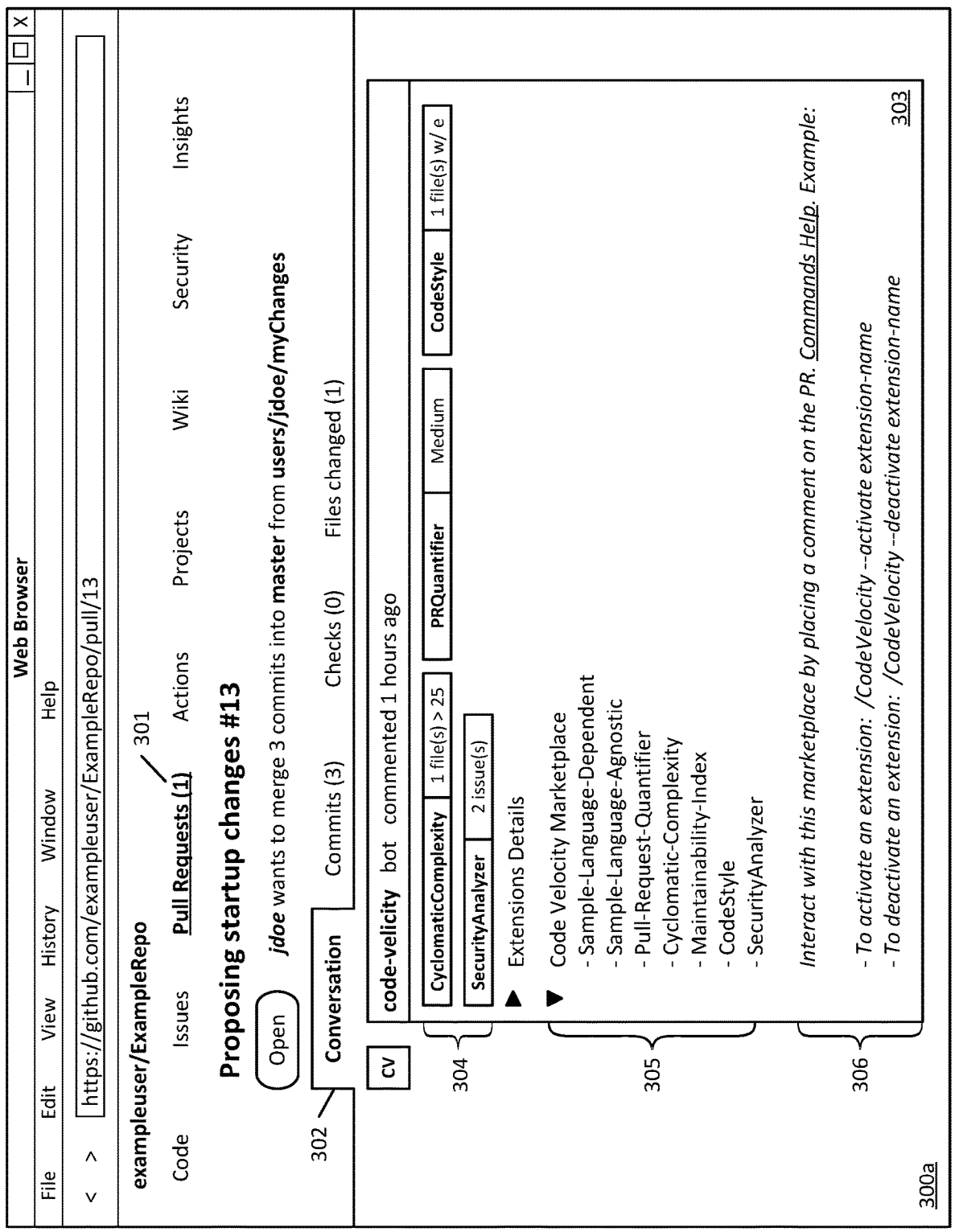
FIG. 3A illustrates an example user interface that integrates super-app extension discovery within the context of a comment feed for a source code management platform context.

For example, FIG. 3A illustrates an example user interface 300a that integrates super-app extension discovery within the context of a comment feed for a source code management platform context. User interface 300a corresponds to a web page of a source code management platform being rendered within a web browser, with the user interface 300a displaying a pull requests 301 section of an "ExampleRepo" code repository (e.g., code repository 114). The user interface 300a also displays a particular pull request, "Proposing startup changes #13" (e.g., context 115). Within this pull request, the user interface 300a displays a conversation tab 302 (e.g., displaying a comment feed associated with context 115), and within the conversation tab 302 the user interface 300a displays a super-app comment 303—such as a comment generated by a code-velocity super-app (e.g., super-app 111).

In user interface 300a, the super-app comment 303 includes an extension output section 304 summarizing the results of the code-velocity super-app having run one or more extensions against code associated with the pull request. For example, the extension output section 304 summarizes the results of having triggered a Cylcomatic-Complexity extension, a PRQuantifier extension, a Code-Style extension, and a SecurityAnalyzer extension. The super-app comment 303 also includes extension details which, when expanded, displays detailed extension output results, extension runtime logs, extension configuration information, and the like.

The super-app comment 303 also includes an extension library section 305 ("Code Velocity Marketplace") showing which extension(s) are available for the code-velocity super-app. Notably, in FIG. 3A, the extension library section 305 shows all available extensions. However, in embodiments, the extension library section 305 may only show a subset of available extensions, such as only extensions that are inactive for the code repository 114, only extensions that are relevant to the code repository 114 and/or the context 115 (e.g., based on code language(s) used by the code repository 114 and/or the context 115), and the like. Additionally, while the extension library section 305 only shows extension names, in embodiments the extension library section 305 may show additional information for each extension, such as whether the extension is activated or deactivated for the code repository 114, what code language(s) the extension is configured to operate against, a description of the extension, a link to a web page for the extension, one or more available configuration options for the extension, and the like.

In accordance with the embodiments herein, the super-app 111 also operates to integrate super-app extension configuration within the context of a comment feed for the context 115. For example, when the super-app 111 posts a comment to a comment feed associated with context 115, the super-app 111 includes, within that comment itself, an indication of a comment-based syntax for configuring super-app extensions (including, for example, activating and deactivating those extensions for the code repository 114). Using this comment-based syntax, users are enabled to interact with the configuration of the super-app 111—including activating and deactivating extensions discovered via the library (e.g., extension library section 305)—through posting of a comment in the comment feed associated with context 115. Thus, the embodiments herein also enable user(s) at the client 110 (or clients) to configure super-app extensions without leaving the context 115 (e.g., in a web browser).

For example, referring to FIG. 3A, the super-app comment 303 also includes a configuration instructions section 306, which provides a sample syntax for use in a comment to activate or deactivate a given extension listed in the extension library section 305. In FIG. 3A, the configuration instructions section 306 indicates that an extension can be activated by posting a comment with the command '/Code-Velocity—activate extension-name' and can be deactivated by posting a comment with the command '/CodeVelocity—deactivate extension-name'. In embodiments, a variety of configuration commands can be supported; for example, in FIG. 3A, the configuration instructions section 306 includes a "Commands Help" link that, when selected, displays are more extensive list of available configuration command. An example command list for a super-app named "SuperApp" is shown in Table 1:

TABLE 1

| Description | Command |
|---|---|
| Activate an extension | /SuperApp --activate extension-name-from-library |
| Deactivate an extension | /SuperApp -deactivate extension-name-from-library |
| Show details from extensions | /SuperApp --details true |
| Default expand main detailed section containing all details from extensions | /SuperApp -expand true |
| Specify an include path, which will mean that the SuperApp will trigger only for that path (similar to git ignore syntax) | /SuperApp --includedpath /path1/path2 |
| Specify an exclude path, which will mean that the SuperApp will only not trigger for that path (similar to git ignore syntax) | /SuperApp --excludedpath /path1/path2 |
| Run silent without outputting anything (e.g., to collect instrumentation data) | /SuperApp --silent true |

Figure 3B:
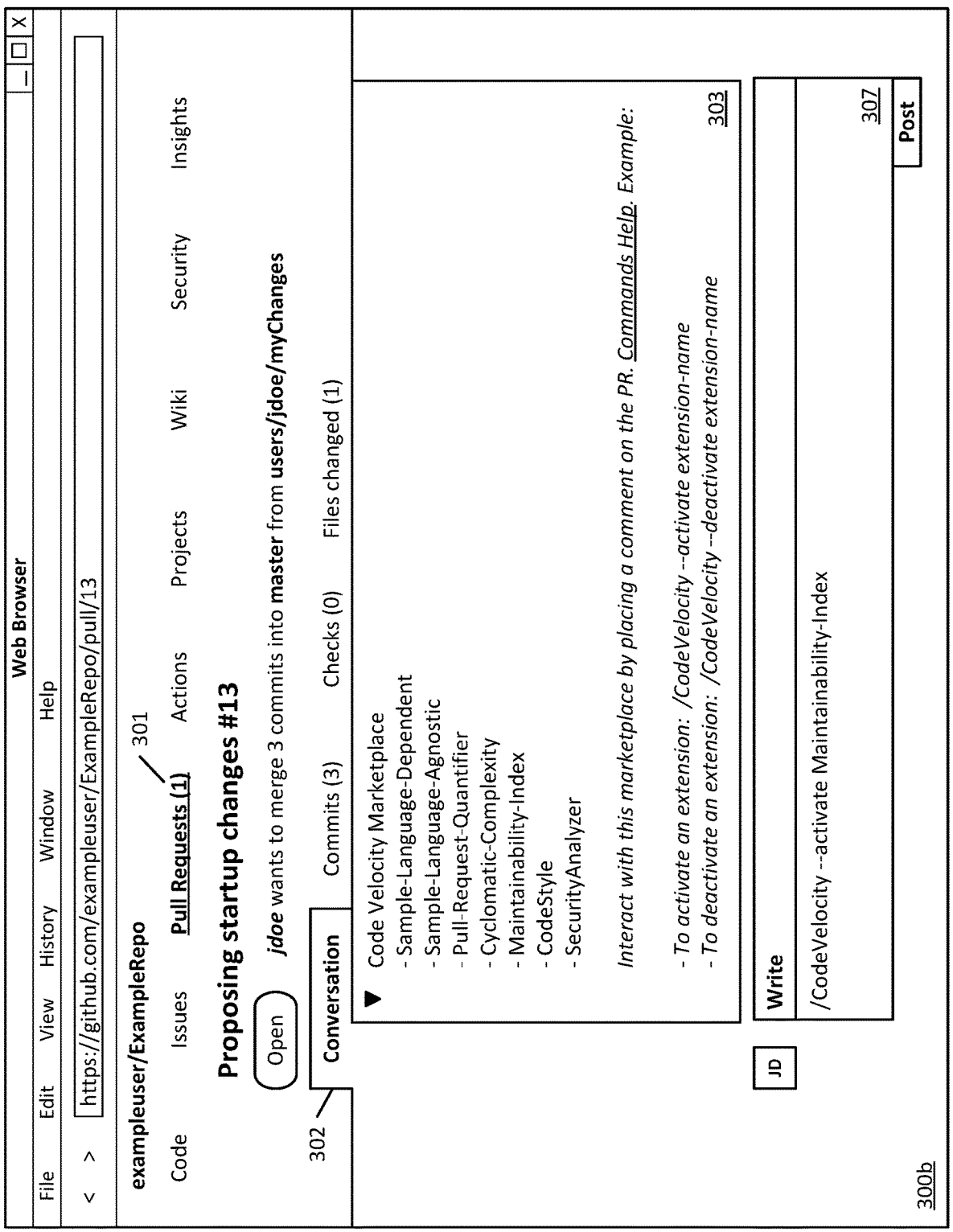
FIG. 3B illustrates an example user interface for providing a comment-based command to configure a super-app.
Figure 3C:
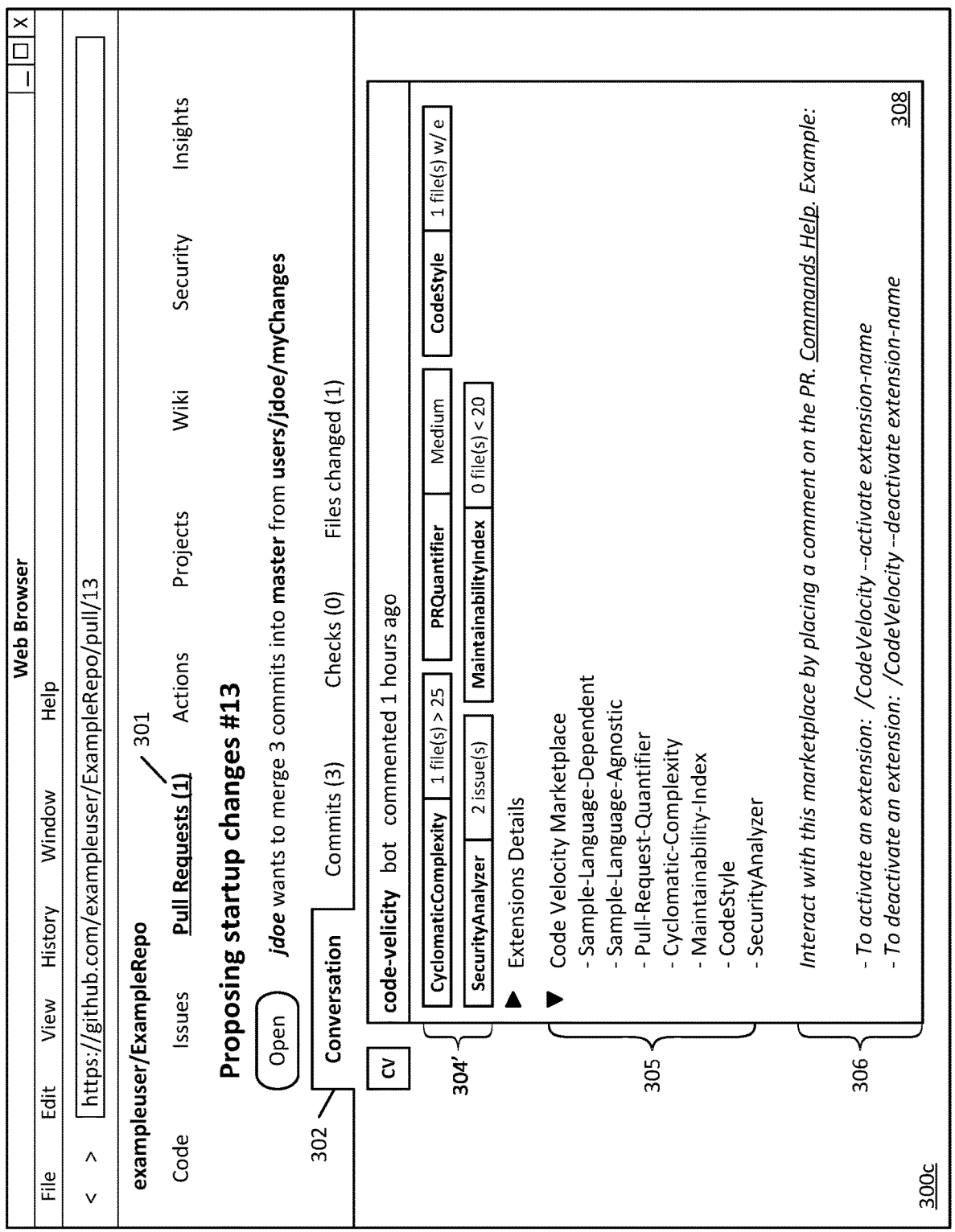
FIG. 3C illustrates an example user interface showing a new super-app comment based on the configuration change made by the comment shown in FIG. 3B.

FIG. 3B illustrates an example user interface 300b for providing a comment-based command to configure a super-app. In user interface 300b, the conversation tab 302 now shows a comment 307 that is being composed, and which includes the command '/CodeVelocity—activate Maintainability-Index'. When this comment is posted to the comment feed of the conversation tab 302, the code-velocity super-app responds to this command by generating a configuration change to activate the "Maintainability-Index" extension to the code-velocity super-app, with respect to the ExampleRepo repository. FIG. 3C illustrates an example user interface 300c showing a new super-app comment 308 that relies on the configuration change made by the comment 307 shown in FIG. 3B. In particular, the new super-app comment 308 includes an extension output section 304' that now includes an output from the Maintainability-Index extension.

In some embodiments herein, when a user interacts with the super-app 111 using a comment-based syntax, the super-app 111 modifies its configuration directly. In other embodiments, the super-app 111 creates new code review request for checking in one or more configuration files (e.g., super-app configuration 116) to a code repository (e.g., code repository 114). In embodiments, this code review request includes any requested configuration changes to the super-app 111 (including to its extensions). In embodiments, this new code review request follows the same approval workflow as other code review requests in the code repository 114. This streamlines the configuration experience for the super-app 111, including all of its extensions, and presents a consistent super-app configuration experience to all super-app users, while letting an owner of the code repository 114 have the final say on super-app configuration changes (i.e., through a normal code review request approval workflow).

Figure 2:
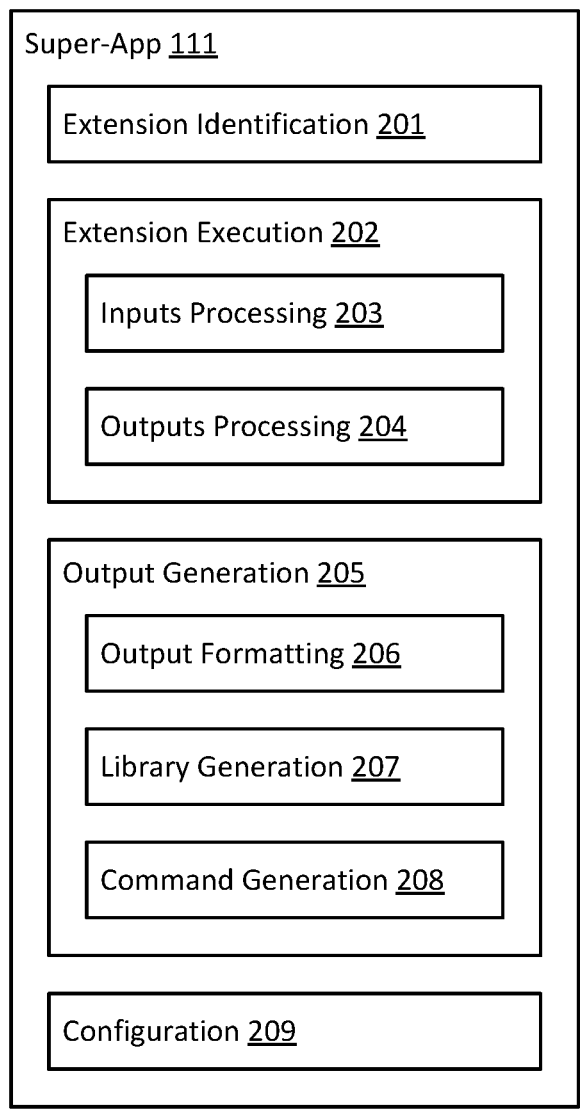
FIG. 2 illustrates example showing components of a super-app.

FIG. 2 illustrates an example 200 showing components of the super-app 111, according to one or more embodiments. These components of the super-app 111 are now described in connection with FIG. 4, which illustrates a flow chart of an example method 400 for integrating super-app extension discovery and configuration within source code management platform comments. In embodiments, instructions for implementing method 400 are encoded as computer-executable instructions (e.g., super-app 111) stored on a computer program product (e.g., storage media 104) that are executable by a processor (e.g., processor 102) to cause a computer system (e.g., super-app host 101, platform host 108) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

In embodiments, the super-app 111 is executed by the platform host 108 based on a triggering event associated with a context 115 within a code repository 114. In embodiments, when the super-app 111 executes, the super-app 111 operates according to the super-app configuration 116 associated with the code repository 114 and posts an output of its operation as a comment on a comment feed of the context 115 associated with the triggering event.

Figure 4:
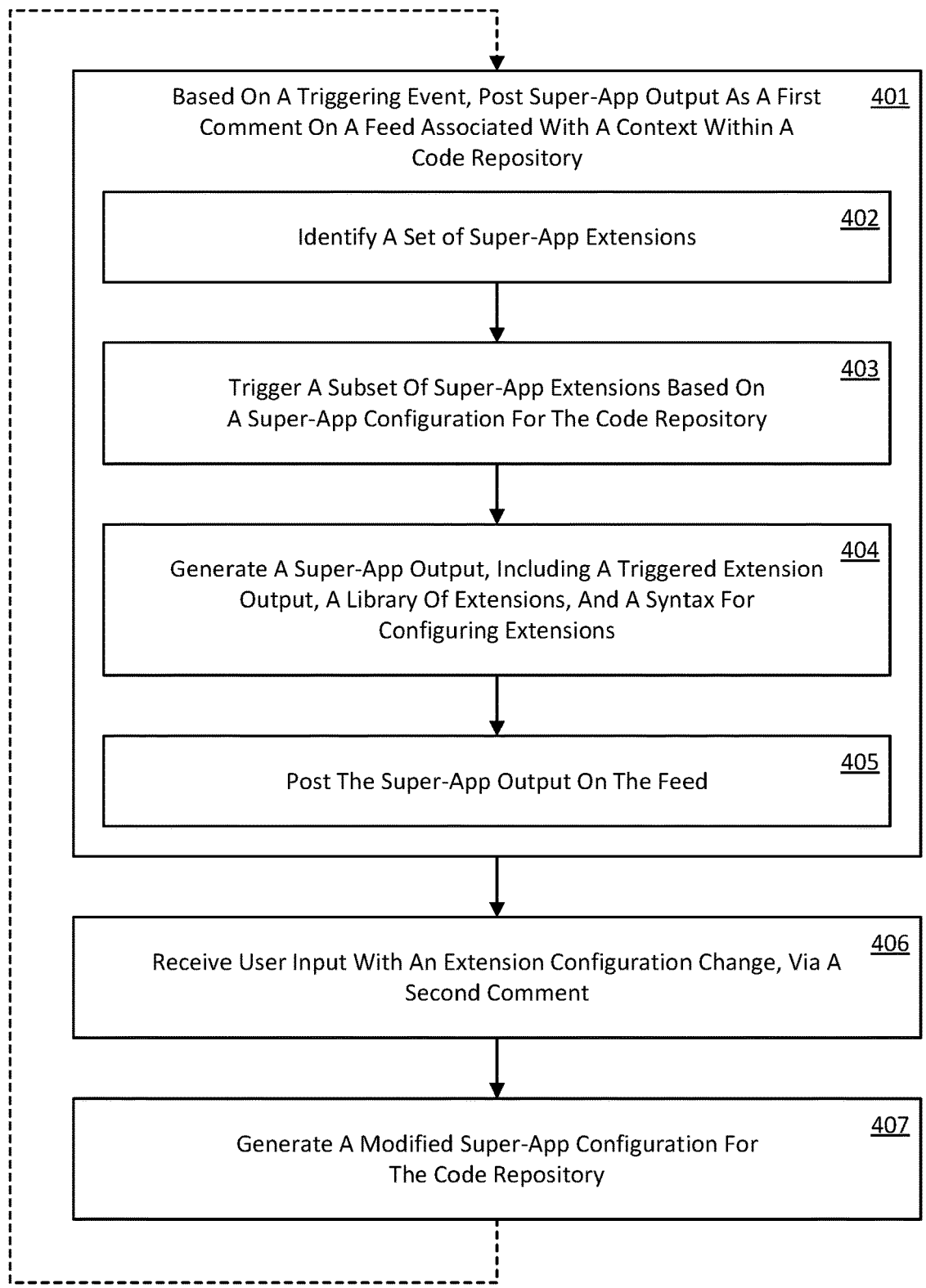
FIG. 4 illustrates a flow chart of an example method for integrating super-app extension discovery and configuration within source code management platform comments.

Referring to FIG. 4, method 400 comprises an act 401 of, based on a triggering event, posting super-app output as a first comment on a feed associated with a context within a code repository. In some embodiments, act 401 comprises, based on a triggering event associated with a context within a source code repository that is managed by a source code management platform, initiating posting of super-app output as a first comment on a comment feed associated with the context. In an example, based on a triggering event associated with context 115, the super-app 111 executes in accordance with super-app configuration 116. Based on this execution, the super-app 111 initiates posting of a comment to a comment feed associated with the context 115. For instance, based on a triggering event associated with the pull request "Proposing startup changes #13" shown in user interface 300a, the super-app 111 initiates posting of super-app comment 303 to a comment feed shown in conversation tab 302.

In embodiments, a triggering event is the creation of the context 115, the modification of the context 115, the posting of a comment to a feed associated with the context 115, and the like. Thus, in embodiments of act 401 the triggering event is one of a creation of the context, a modification to the context, or a posting of a comment to the comment feed associated with the context. In embodiments of act 401, the context 115 is a code review request, such as a GitHub pull request.

Referring to FIG. 2, the super-app 111 is shown as including an extension identification component 201. In embodiments, based at least on execution of the super-app 111, the extension identification component 201 identifies which extensions 112 are available for the super-app 111. In embodiments, the extension identification component 201 identifies the extensions 112 based on one or more of: a super-app configuration 116 for the code repository 114, a global configuration for the super-app 111, a hard-coded list contained within the super-app 111, and the like. Referring to FIG. 4, act 401 comprises an act 402 of identifying a set of super-app extensions. In some embodiments, act 402 comprises identifying a set of extensions to a super-app, the set of extensions being available for execution against the context. In an example, the extension identification component 201 identifies the extensions 112 that are available to super-app 111.

Referring to FIG. 2, the super-app 111 is shown as including an extension execution component 202. In embodiments, the extension execution component 202 identifies at least a subset of the extensions 112 that were identified by the extension identification component 201, and triggers execution of that subset of extensions against an appropriate context (e.g., context 115). Referring to FIG. 4, act 401 also comprises an act 403 of triggering a subset of super-app extensions based on a super-app configuration for the code repository. In some embodiments, act 403 comprises, based on a super-app configuration associated with the code repository, triggering execution of at least a subset of the set of extensions against the context. In an example, the extension execution component 202 identifies a subset of extensions 112 based at least on the super-app configuration 116, and triggers execution of that subset of extensions against context 115.

In embodiments, the extension execution component 202 determines which extensions to include in the subset of extensions based on the super-app configuration 116 associated with the code repository 114 to which the context 115 belongs; for example, the extension execution component 202 determines, based on super-app configuration 116, which extensions are activated or deactivated for the code repository 114. Thus, in some embodiments of act 403, the subset of extensions includes only extensions from the set of extensions that have been determined to be active, based on the super-app configuration associated with the code repository.

In embodiments, the extension execution component 202 determines which extensions to include in the subset of extensions based on determining if those extensions are relevant to a context; for example, the extension execution component 202 determines which activated extensions are relevant to code language(s) used by the context 115 and includes only those extensions in the subset of extensions. Thus, in some embodiments of act 403, the subset of extensions includes only extensions from the set of extensions that have been determined to be relevant to the context.

The extension execution component 202 is shown as including an inputs processing component 203 and an outputs processing component 204. In embodiments, the inputs processing component 203 identifies and supplies inputs to each extension in the subset of extensions. For example, the inputs processing component 203 identifies code relevant to context 115 and supplies that code to the subset of extensions as inputs to those extensions. Thus, in some embodiments of act 403, triggering execution of at least the subset of extensions against the context includes providing at least one portion of code repository data to each extension in the subset of extensions as input to the extension. In embodiments, the outputs processing component 204 collects outputs from execution of the subset of extensions, so that the super-app 111 can present those output in a comment. Notably, using the inputs processing component 203 and the processing component 204, the super-app 111 fully controls the inputs and outputs to the extensions that it executes. Thus, all configuration of those extensions is handled by the super-app 111. Additionally, any security settings and context applied to the super-app 111 are automatically applied to the extensions that the super-app 111 executes.

Referring to FIG. 2, the super-app 111 is shown as including an output generation component 205. In embodiments, as an output of execution of the super-app 111 based on context 115, the output generation component 205 generates and posts a comment to a comment feed of context 115. The output generation component 205 can output a variety of data to a comment. The output generation component 205 is shown as including an output formatting component 206, a library generation component 207, and command generation component 208. In embodiments, the output formatting component 206 generates results of the extension execution component 202 having executed the subset of extensions (e.g., extension output section 304, extension output section 304'). In embodiments, the library generation component 207 generates a library of the extensions available to the super-app 111 (e.g., extension library section 305), such as at least a portion of the extensions identified by the extension identification component 201. In embodiments, the command generation component 208 generates a sample syntax for use in a comment to activate or deactivate a given extension (e.g., configuration instructions section 306).

Referring to FIG. 4, act 401 also comprises an act 404 of generating a super-app output, including a triggered extension output, a library of extensions, and a syntax for configuring extensions. In some embodiments, act 404 comprises generating a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app. In an example, referring to user interface 300a and super-app comment 303, the output formatting component 206 generates the extension output section 304, the library generation component 207 generates the extension library section 305, and the command generation component 208 generates the configuration instructions section 306.

In embodiments, when generating the results of the extension execution component 202 having executed the subset of extensions (e.g., extension output section 304), the output formatting component 206 utilizes the processing component 204 to present outputs from a variety of extensions in a unified, common display format. For example, even though extensions may be authored by different entities, and may return different types of results in different formats, the output formatting component 206 presents those results in a consistent manner. For example, in extension output section 304 the results of various extensions are aggregated into a unified summary format (i.e., an indication of extension name, and a summary of results from that extension). Thus, in embodiments of act 404, the output of having triggered the subset of extensions against the context aggregates a plurality of outputs from a plurality of extensions into a common display format.

Act 401 also comprises an act 405 of posting the super-app output on the feed. In some embodiments, act 405 comprises initiating posting of the super-app output as a first comment on a comment feed associated with the context. In an example, after generating the super-app output in act 404, the output generation component 205 posts that output to a comment feed associated with the context 115 (e.g., super-app comment 303 in a comment feed shown in conversation tab 302).

Referring to FIG. 2, the super-app 111 is shown as including a configuration component 209. In embodiments, the configuration component 209 operates when the super-app 111 is executed by the platform host 108 in response to comment that includes configuration command(s). For example, FIG. 3B shows a comment 307 that includes the command '/CodeVelocity—activate Maintainability—Index'. In embodiments, the configuration component 209 receives a configuration option, and generates a modified configuration for an appropriate context. For example, when a configuration option is provided by posting of a command within a comment on a comment feed for context 115, the configuration component 209 generates a modified configuration for super-app configuration 116.

Referring to FIG. 4, method 400 also comprises an act 406 of receiving user input with an extension configuration change, via a second comment. In some embodiments, act 406 comprises, after initiating posting of the super-app output as the first comment on the comment feed, receiving a user input via a second comment on the comment feed, the user input using the comment-based syntax to specify a configuration change for a particular extension in the set of extensions. In an example, based on super-app comment 303, the super-app 111 is executed with '—activate Maintainability-Index' specified as a configuration option. Based on the presence of this configuration option, the super-app 111 invokes the configuration component 209.

Method 400 also comprises an act 407 of generating a modified super-app configuration for the code repository. In some embodiments, act 407 comprises, based at least on the user input, generating a modified super-app configuration associated with the code repository, the modified super-app configuration comprising the configuration change for the particular extension in the set of extensions. In an example, the configuration component 209 generates a modification to super-app configuration 116, including a configuration change that activates the Maintainability-Index extension.

In embodiments, when the configuration component 209 generates a modified configuration, the configuration component 209 creates new code review request (e.g., GitHub pull request) for checking in one or more configuration files (e.g., super-app configuration 116) to a code repository (e.g., code repository 114). In embodiments, this code review request includes any requested configuration changes to the super-app 111 (including to its extensions). Thus, in some embodiments of act 407, generating the modified super-app configuration associated with the code repository comprises generating a code review request associated with the code repository.

As shown by a broken arrow between act 407 and act 401 in FIG. 4, in embodiments, method 400 repeats based on new triggering events, such as modification of context 115, posting of a comment to a comment feed associated with context 115, and the like. Thus, in some embodiments the triggering event is a first triggering event, the subset of extensions is a first subset of extensions, and the super-app output is a first super-app output. Then, based on a second triggering event associated with the context, method 400 repeats. In embodiments, when method 400 repeats, it uses a modified super-app configuration generated in act 407. Thus, in some embodiments, performance of this repeat of method 400 includes performing at least: based on the modified super-app configuration associated with the code repository, triggering execution of at least a second subset of the set of extensions against the context; generating a second super-app output, the second super-app output including an output of having triggered the second subset of extensions against the context; and initiating posting of the second super-app output as a third comment on the comment feed associated with the context.

In embodiments of act 407, the configuration change for the particular extension in the set of extensions is a deactivation of the particular extension. Thus, in embodiments, the first subset of extensions includes the particular extension; the configuration change for the particular extension comprises deactivating the particular extension; and based on the configuration change for the particular extension, the second subset of the set of extensions excludes the particular extension.

In embodiments of act 407, the configuration change for the particular extension in the set of extensions is an activation of the particular extension. Thus, in embodiments, the first subset of extensions excludes the particular extension; the configuration change for the particular extension comprises activating the particular extension; and based on the configuration change for the particular extension, the second subset of the set of extensions includes the particular extension.

Accordingly, the embodiments described herein integrate super-app extension discovery and configuration using source code management platform comments, such as code review request comments. In embodiments, when a super-app posts a comment within a source code management platform context (e.g., a comment feed associated with a code review request), the super-app includes in that comment a library of extensions to the super-app that are available for users as part of the super-app. Thus, the embodiments herein enable users to discover available super-app extensions without losing their current context within the source code management platform. Additionally, in embodiments, the super-app also includes in that comment an indication of a comment-based syntax for configuring super-app extensions (including, for example, activating and deactivating those extensions for a given code repository). Using this comment-based syntax, users are enabled to interact with the super-app—including activating and deactivating extensions discovered via the library—through posting of a comment in their current context (e.g., a code review request comment). Thus, the embodiments herein also enable users configure super-app extensions without losing their current context within the source code management platform.

In embodiments, when a user interacts with the super-app using a comment-based syntax, the super-app creates new code review request for checking in one or more configuration files to the code repository, which include any requested configuration changes to the super-app (including to its extensions). In embodiments, this new code review request follows the same approval workflow as other code review requests in the code repository. This streamlines the configuration experience for the super-app, including all of its extensions, and presents a consistent super-app configuration experience to all super-app users, while letting a code repository owner have the final say on super-app configuration changes (i.e., through a normal code review request approval workflow).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., super-app host 101, platform host 108) that includes computer hardware, such as, for example, one or more processors (e.g., processor 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, embodiments of the invention can comprise at least two distinctly different kinds of computer-readable media: computer storage media and transmission media. Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for integrating super-app extension discovery and configuration within source code management platform comments, the method comprising:
    based on a triggering event associated with a context within a code repository that is managed by a source code management platform, performing at least:
        identifying a set of extensions to a super-app, the set of extensions being available for execution against the context;
        based on a super-app configuration associated with the code repository, triggering execution of at least a subset of the set of extensions against the context;
        generating a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app; and
        initiating posting of the super-app output as a first comment on a comment feed associated with the context;
    after initiating posting of the super-app output as the first comment on the comment feed, receiving a user input via a second comment on the comment feed, the user input using the comment-based syntax to specify a configuration change for a particular extension in the set of extensions; and
    based at least on the user input, generating a modified super-app configuration associated with the code repository, the modified super-app configuration comprising the configuration change for the particular extension in the set of extensions.

2. The method of claim 1, wherein the triggering event is a first triggering event, the subset of extensions is a first subset of extensions, and the super-app output is a first super-app output, the method further comprising:
    based on a second triggering event associated with the context, performing at least:
        based on the modified super-app configuration associated with the code repository, triggering execution of at least a second subset of the set of extensions against the context;
        generating a second super-app output, the second super-app output including an output of having triggered the second subset of extensions against the context; and
        initiating posting of the second super-app output as a third comment on the comment feed associated with the context.

3. The method of claim 2, wherein:
    the first subset of extensions includes the particular extension;
    the configuration change for the particular extension comprises deactivating the particular extension; and
    based on the configuration change for the particular extension, the second subset of the set of extensions excludes the particular extension.

4. The method of claim 2, wherein:
    the first subset of extensions excludes the particular extension;

the configuration change for the particular extension comprises activating the particular extension; and based on the configuration change for the particular extension, the second subset of the set of extensions includes the particular extension.

5. The method of claim 1, wherein the context is a code review request.

6. The method of claim 1, wherein the triggering event is one of:
a creation of the context,
a modification to the context; or
a posting of a comment to the comment feed associated with the context.

7. The method of claim 1, wherein the subset of extensions includes only extensions from the set of extensions that have been determined to be relevant to the context.

8. The method of claim 1, wherein the subset of extensions includes only extensions from the set of extensions that have been determined to be active, based on the super-app configuration associated with the code repository.

9. The method of claim 1, wherein triggering execution of at least the subset of extensions against the context includes providing at least one portion of code repository data to each extension in the subset of extensions as input to the extension.

10. The method of claim 1, wherein the output of having triggered the subset of extensions against the context aggregates a plurality of outputs from a plurality of extensions into a common display format.

11. The method of claim 1, wherein generating the modified super-app configuration associated with the code repository comprises generating a code review request associated with the code repository.

12. A computer system for integrating super-app extension discovery and configuration within source code management platform comments, comprising:
a processor; and
a computer storage media that stores computer-executable instructions that are executable by the processor to cause the computer system to at least:
based on a triggering event associated with a context within a code repository that is managed by a source code management platform, perform at least:
identify a set of extensions to a super-app, the set of extensions being available for execution against the context;
based on a super-app configuration associated with the code repository, trigger execution of at least a subset of the set of extensions against the context;
generate a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app; and
initiate posting of the super-app output as a first comment on a comment feed associated with the context;
after initiating posting of the super-app output as the first comment on the comment feed, receive a user input via a second comment on the comment feed, the user input using the comment-based syntax to specify a configuration change for a particular extension in the set of extensions; and
based at least on the user input, generate a modified super-app configuration associated with the code repository, the modified super-app configuration comprising the configuration change for the particular extension in the set of extensions.

13. The computer system of claim 12, wherein:
the triggering event is a first triggering event, the subset of extensions is a first subset of extensions, and the super-app output is a first super-app output; and
the computer-executable instructions also include instructions that are executable by the processor to cause the computer system to:
based on a second triggering event associated with the context, perform at least:
based on the modified super-app configuration associated with the code repository, trigger execution of at least a second subset of the set of extensions against the context;
generate a second super-app output, the second super-app output including an output of having triggered the second subset of extensions against the context; and
initiate posting of the second super-app output as a third comment on the comment feed associated with the context.

14. The computer system of claim 13, wherein:
the first subset of extensions includes the particular extension;
the configuration change for the particular extension comprises deactivating the particular extension; and
based on the configuration change for the particular extension, the second subset of the set of extensions excludes the particular extension.

15. The computer system of claim 13, wherein:
the first subset of extensions excludes the particular extension;
the configuration change for the particular extension comprises activating the particular extension; and
based on the configuration change for the particular extension, the second subset of the set of extensions includes the particular extension.

16. The computer system of claim 12, wherein the context is a code review request.

17. The computer system of claim 12, wherein the triggering event is one of:
a creation of the context,
a modification to the context; or
a posting of a comment to the comment feed associated with the context.

18. The computer system of claim 12, wherein the subset of extensions includes only extensions from the set of extensions that have been determined to be relevant to the context.

19. The computer system of claim 12, wherein the subset of extensions includes only extensions from the set of extensions that have been determined to be active, based on the super-app configuration associated with the code repository.

20. A computer program product comprising a computer storage media that stores computer-executable instructions that are executable by a processor to cause a computer system to integrate super-app extension discovery and configuration within source code management platform comments, the computer-executable instructions including instructions that are executable by the processor to cause the computer system to at least:

based on a triggering event associated with a context within a code repository that is managed by a source code management platform, perform at least:
   identify a set of extensions to a super-app, the set of extensions being available for execution against the context;
   based on a super-app configuration associated with the code repository, trigger execution of at least a subset of the set of extensions against the context;
   generate a super-app output, the super-app output including: (i) an output of having triggered the subset of extensions against the context, (ii) a listing of one or more of the set of extensions as being a library of available extensions to the super-app, and (iii) an indication of a comment-based syntax for configuring an extension to the super-app; and
   initiate posting of the super-app output as a first comment on a comment feed associated with the context;
after initiating posting of the super-app output as the first comment on the comment feed, receive a user input via a second comment on the comment feed, the user input using the comment-based syntax to specify a configuration change for a particular extension in the set of extensions; and
based at least on the user input, generate a modified super-app configuration associated with the code repository, the modified super-app configuration comprising the configuration change for the particular extension in the set of extensions.

* * * * *